US008474942B2

(12) United States Patent
Kawai (10) Patent No.: US 8,474,942 B2
(45) Date of Patent: Jul. 2, 2013

(54) IMAGE CORRECTION SYSTEM AND IMAGE CORRECTION METHOD

(75) Inventor: Yoshinori Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 12/699,559

(22) Filed: Feb. 3, 2010

(65) Prior Publication Data

US 2010/0207972 A1 Aug. 19, 2010

(30) Foreign Application Priority Data

Feb. 13, 2009 (JP) ................................. 2009-031966
Jan. 26, 2010 (JP) ................................. 2010-014677

(51) Int. Cl.
*B41J 29/393* (2006.01)

(52) U.S. Cl.
USPC ............................................ 347/19; 358/3.26

(58) Field of Classification Search
USPC ........................................... 347/19; 358/3.26
See application file for complete search history.

(56) References Cited

U.S. PATENT DOCUMENTS

| 5,712,666 | A * | 1/1998 | Matsubara et al. ............. 347/19 |
| 6,788,434 | B1 | 9/2004 | Kanematsu et al. ........... 358/1.9 |
| 6,795,213 | B1 | 9/2004 | Hanyu |
| 6,853,464 | B1 | 2/2005 | Ueda et al. |
| 6,945,626 | B2 | 9/2005 | Tsuchiya et al. |
| 7,948,666 | B2 * | 5/2011 | Yoshida et al. ............... 358/518 |
| 2001/0015815 | A1 * | 8/2001 | Hada et al. .................... 358/1.9 |
| 2005/0185011 | A1 * | 8/2005 | Kakutani ........................ 347/19 |
| 2006/0028665 | A1 | 2/2006 | Kawai |
| 2006/0126139 | A1 * | 6/2006 | Tanaka ........................... 358/518 |
| 2006/0276978 | A1 | 12/2006 | Yamamoto et al. ............. 702/55 |
| 2007/0019258 | A1 * | 1/2007 | Hattori .......................... 358/518 |
| 2007/0030525 | A1 * | 2/2007 | Ono ............................... 358/406 |
| 2008/0018962 | A1 | 1/2008 | Kawai |
| 2009/0002390 | A1 * | 1/2009 | Kuno ............................. 345/593 |
| 2009/0003696 | A1 | 1/2009 | Ishii et al. |
| 2010/0110460 | A1 * | 5/2010 | Miyata ............................. 358/1.9 |
| 2010/0208304 | A1 | 8/2010 | Murase |

FOREIGN PATENT DOCUMENTS

| JP | 2000-209450 | 7/2000 |
| JP | 2000-301773 | 10/2000 |
| JP | 3867437 | 1/2007 |

OTHER PUBLICATIONS

U.S. Office Action dated Aug. 29, 2012 in U.S. Appl. No. 12/697,792.

* cited by examiner

*Primary Examiner* — Julian Huffman
*Assistant Examiner* — Sharon A Polk
(74) *Attorney, Agent, or Firm* — Fitzpatrick, Cella, Harper & Scinto

(57) ABSTRACT

Every time density correction information corresponding to a colorimetric value of a patch is acquired, the time when the density correction information is acquired and the type of a printing medium on which the patch is printed are accumulated in association in a memory. The type of a medium for printing is specified by a user; density correction information acquired at the most up-to-date time for each chromatic color ink available for the medium of that type is read from the memory; it is determined whether or not the most up-to-date time when the density correction information is acquired for each of the chromatic color inks available for the specified medium is the same time; if the most up-to-date times are the same, density correction is performed on image data, using a correction table that corresponds to the density correction information acquired at the most up-to-date time.

20 Claims, 8 Drawing Sheets

|        | C1 | M1 | Y1 | C2 | M2 | K1 | K2 |
|--------|----|----|----|----|----|----|----|
| TIME 2 | 0  | -1 | 0  |    |    |    |    |
| TIME 1 | 2  | 1  | 3  |    |    | 1  | 2  |

Row labels: PRINTING MEDIUM A (TIME 2), PRINTING MEDIUM D (TIME 1)

FIG. 7

|                      | C1     | M1     | Y1     | C2 | M2 | K1     | K2 |
|----------------------|--------|--------|--------|----|----|--------|----|
| MOST UP-TO-DATE RANK | 0      | -1     | 0      |    |    | 1      |    |
| COMPUTED TIME        | TIME 2 | TIME 2 | TIME 2 |    |    | TIME 2 |    |

FIG. 8

|        | C1 | M1 | Y1 | C2 | M2 | K1 | K2 |
|--------|----|----|----|----|----|----|----|
| TIME 2 | 0  | -1 | 0  |    |    | 1  |    |
| TIME 1 |    |    | 3  | 1  | 2  | 2  |    |

Row labels: PRINTING MEDIUM A (TIME 2), PRINTING MEDIUM B (TIME 1)

FIG. 9

| | C1 | M1 | Y1 | C2 | M2 | K1 | K2 |
|---|---|---|---|---|---|---|---|
| MOST UP-TO-DATE RANK | 0 | -1 | 0 | 1 | 2 | 1 | |
| COMPUTED TIME | TIME 2 | TIME 2 | TIME 2 | TIME 1 | TIME 1 | TIME 2 | |

FIG. 10

| | | C1 | M1 | Y1 | C2 | M2 | K1 | K2 |
|---|---|---|---|---|---|---|---|---|
| TIME 2 | PRINTING MEDIUM A | 0 | -1 | 0 | | | 1 | |
| TIME 1 | PRINTING MEDIUM C | 2 | 2 | 1 | 3 | | | 0 |

FIG. 11

| | C1 | M1 | Y1 | C2 | M2 | K1 | K2 |
|---|---|---|---|---|---|---|---|
| MOST UP-TO-DATE RANK | 0 | -1 | 0 | | | 1 | 0 |
| COMPUTED TIME | TIME 2 | TIME 2 | TIME 2 | | | TIME 2 | TIME 1 |

FIG. 12

|  | C1 | M1 | Y1 | R | G | K1 |
|---|---|---|---|---|---|---|
| PRINTING MEDIUM A | ○ | ○ | ○ |  |  | ○ |
| PRINTING MEDIUM E | ○ | ○ | ○ | ○ | ○ | ○ |

FIG. 13

|  | C1 | M1 | Y1 | R | G | K1 |
|---|---|---|---|---|---|---|
| TIME 2 | PRINTING MEDIUM A | 0 | -1 | 0 | 0 | 1 |
| TIME 1 | PRINTING MEDIUM E | 2 | 1 | 3 | 1 | 2 |

FIG. 14

|  | C1 | M1 | Y1 | R | G | K1 |
|---|---|---|---|---|---|---|
| MOST UP-TO-DATE RANK | 0 | -1 | 0 | 1 | 2 | 1 |
| COMPUTED TIME | TIME 2 | TIME 2 | TIME 2 | TIME 1 | TIME 1 | TIME 2 |

IMAGE CORRECTION SYSTEM AND IMAGE CORRECTION METHOD

BACKGROUND OF THE INVENTION

1. Field of the Invention

The present invention relates to an image correction system and image correction method for correcting an image.

2. Description of the Related Art

Continuous use of the same printer results in variations in the output characteristics of the printer, such as output colors and gradation, due to changes in the density of ink, the ink discharge characteristics of the heads, or the like with the passage of time. A technique called "calibration" has been developed in order to stabilize the output characteristics irrespective of the above-mentioned changes with time. With the technique, the amounts of such output characteristics are measured at regular intervals, calibration information is computed from the measured values, and correction is performed based on the computed information, which enables a printer to be used with stable output characteristics. Since such calibration information is computed at regular intervals, holding computed calibration information and changing information as necessary into past information are also considered (Japanese Patent Laid-Open No. 2000-301773).

Conventional printers use only CMYK color ink such as cyan (C) ink, magenta (M) ink, yellow (Y) ink, black (K) ink, light cyan (LC) ink, and light magenta (Lm) ink. However, for higher image quality in printers, inks called spot color inks, such as gray (Gr) ink, red (R) ink, green (G) ink, and blue (B) ink, are also used to increase the number of colors to fall within the range of approximately eight to twelve. Additionally, in some cases, in consideration of, for example, a difference in the rate of ink absorption into the surface between glossy paper and non-glossy paper, different types of ink, one type for glossy paper and the other for non-glossy paper, may be used as the same color ink in order to produce better output. In other cases, the number of inks to be used may vary depending on whether importance is placed on image quality or printing speed during printing. For example, for high-quality printing, spot color inks or the like are used so as to perform printing with a great number of inks.

After the creation of such calibration information, color shifts occur due to changes in the density of the ink or the amount discharged from heads with the passage of time. It is thus desirable that calibration information be created at regular intervals. Conventionally, calibration information has been created at the same time for every ink used in a printer, so that the information on every ink has been updated at regular intervals. However, with increasing image quality and number of colors in printers, available inks vary depending on each printing medium and the quality thereof, so that all inks may not be used for a single printing medium. In such a case, calibration information on every ink cannot be created at one time.

In the case of printing a printing medium that uses any ink other than those with which calibration information has already been obtained from the last computation, if calibration information is computed every time immediately before printing, information on every ink to be used is always up-to-date and the same accuracy as usual can thus be obtained. Such computation of calibration information is, however, undesirable because it takes time and requires effort on the part of the user.

Thus, in the case of printing a printing medium that uses any ink other than those with which calibration information has already been obtained from the last computation, it is conceivable that calibration information computed with all inks used for a printing medium to be printed is searched for from a history that has been obtained from past computations except the last computation. Then, the calibration information in the history is used.

In this case, however, the calibration information in the history is used for all inks, which may inhibit effective use of up-to-date information for some types of inks.

In addition, although the number of types of inks increases with an increase in the number of colors, the influence of calibration on visual characteristics varies depending on the type of each ink. In the case where some chromatic color inks, such as cyan (C) ink, magenta (M) ink, yellow (Y) ink, light cyan (Lc) ink, and light magenta (Lm) ink, have their calibration information shifted, their color balance is disturbed. This is particularly noticeable in gray and skin colors, to which humans are highly sensitive in terms of visual characteristics. Meanwhile, in the case where some achromatic color inks, such as black (K) ink and gray (Gr) ink, have their calibration information shifted, such a shift affects only brightness components and gives no influence on the color balance. Moreover, spot color inks, such as red (R) ink, green (G) ink, and blue (B) ink, have no influence on gray and skin colors because such spot color inks are used only in specific color areas and not used on the gray axis. That is, a shift in the color balance of chromatic color inks is noticeable in gray and skin colors, to which humans are highly sensitive in terms of visual characteristics, and is thus likely to cause image degradation. On the other hand, because shifts in brightness components are more allowable than shifts in color balance, it can be said that shifts in achromatic color inks have a small influence on visual characteristics. It can also be said that shifts in spot color inks have a small influence on visual characteristics because they affect only specific color areas.

As described, a calibration method needs to be developed in consideration of the fact that the influence of calibration on visual characteristics varies depending on the type of each ink. If calibration information on every ink cannot be computed at the same time, it is necessary to achieve a calibration method that can maintain the accuracy of calibration so as to make allowable a shift in the color balance of chromatic color inks that have the most influence on visual characteristics.

SUMMARY OF THE INVENTION

An aspect of the present invention is to eliminate the above-mentioned problems with the conventional technology.

The present invention provides an image correction system and image correction method that, in the case where calibration information on every ink cannot be acquired at the same time, reduces the number of user man-hours while maintaining the accuracy of calibration so as to make allowable a shift in the color balance of chromatic color inks that have the most influence on visual characteristics.

The present invention in its first aspect provides an image correction system that measures a patch printed on a printing medium with an inkjet printer, so as to perform density correction on image data to be printed, the inkjet printer being capable of printing with inks that include a plurality of chromatic colors, the system comprising: a colorimetric-value-acquiring unit configured to acquire colorimetric values by performing colorimetry on patches printed with the inkjet printer in those of the inks that have been associated for use with each of a plurality of kinds of printing media; a storage unit configured to obtain density correction information for each ink color based on the colorimetric values acquired by the colorimetric-value-acquiring unit and store the density correction information and a time when the density correction information has been acquired in a memory in association with the ink color; a receiving unit configured to receive information about user selection of a printing medium used for printing; a reading unit configured to read, from among the times stored in the memory, the most up-to-date times for the inks that are used for printing on the printing medium that corresponds to the information received by the receiving unit; a determining unit configured to determine whether or not the most up-to-date times for multiple chromatic color inks, out of the most up-to-date times read by the reading unit for the inks used for printing on the printing medium, are the same time; and a correction unit configured to, if the determining unit has determined that the most up-to-date times are the same time, perform density correction on the image data to be printed according to the density correction information acquired at the most up-to-date time.

The present invention in its second aspect provides an image correction method for measuring a patch printed on a printing medium with an inkjet printer, so as to perform density correction on image data to be printed, the inkjet printer being capable of printing with inks that include a plurality of chromatic colors, the method comprising: a colorimetric-value-acquiring step of acquiring colorimetric values by performing colorimetry on patches printed with the inkjet printer in those of the inks that have been associated for use with each of a plurality of kinds of printing media; a storage step of obtaining density correction information for each ink color based on the colorimetric values acquired in the colorimetric-value-acquiring step and storing the density correction information and a time when the density correction information has been acquired in a memory in association with the ink color; a receiving step of receiving information about user selection of a printing medium used for printing; a reading step of reading, from among the times stored in the memory, the most up-to-date times for the inks that are used for printing on the printing medium that corresponds to the information received by the receiving unit; a determining step of determining whether or not the most up-to-date times for multiple chromatic color inks, out of the most up-to-date times read by the reading unit for the inks that are used for printing on the printing medium, are the same time; and a correction step of, if it has been determined in the determining step that the most up-to-date times are the same time, performing density correction on the image data to be printed according to the density correction information acquired at the most up-to-date time.

According to the present invention, in the case where calibration information on all inks used for printing cannot be acquired at the same time, it is possible to reduce the number of user man-hours while maintaining the accuracy of calibration so as to make allowable a shift in the color balance that has the most influence on visual characteristics.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that the same components are denoted by the same reference numerals, and repeated description is omitted.

First Embodiment

Figure 1:
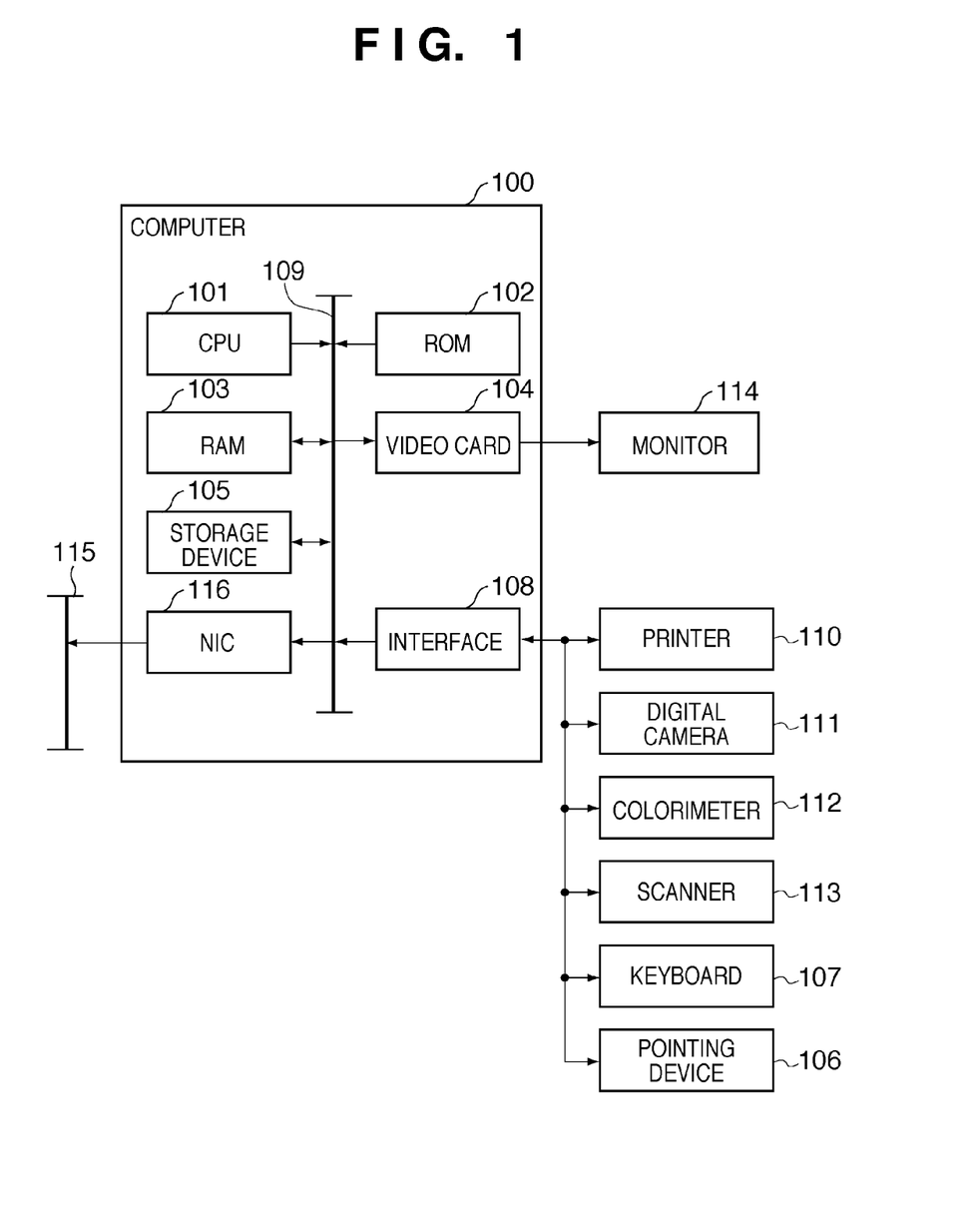
FIG. 1 is a diagram illustrating an example of a configuration of an image correction system.

FIG. 1 is a diagram illustrating an example of a configuration of an image correction system. An information processing apparatus 100 includes a CPU 101, a ROM 102, a RAM 103, and a video card 104 that provides connection to a monitor 114 (which may include a touch panel). It further includes a storage device 105 serving as a storage area, such as an HDD (hard disk drive) or a memory card. The apparatus also includes an interface 108 for a serial bus such as USB or IEEE 1394 to provide connection to a pointing device 106 such as a mouse, a stylus, or a tablet and to a keyboard 107. The apparatus further includes a network interface card (NIC) 116 that provides connection to a network 115. These components are connected to one another via a system bus 109. The interface 108 can establish connection with a printer 110 such as an inkjet printer that serves as an image forming apparatus, a digital camera 111, a colorimeter 112, a scanner 113, and so on.

The CPU 101 loads a program (which includes an image processing program described below) stored in either the ROM 102 or the storage device 105 into the RAM 103 that serves as a work memory, so as to execute the program.

According to the program, the above-mentioned components are controlled via the system bus 109 so as to implement the function of the program.

Note that FIG. 1 illustrates a general hardware configuration of the information processing apparatus described in the present embodiment, and even a configuration without some components or with additional devices is also included within the scope of the present invention. The present embodiment describes the configuration in which printing, colorimetry, and correction are performed for each gradation of each ink for a printing medium of a certain type (such as a printing medium of paper).

Figure 2:
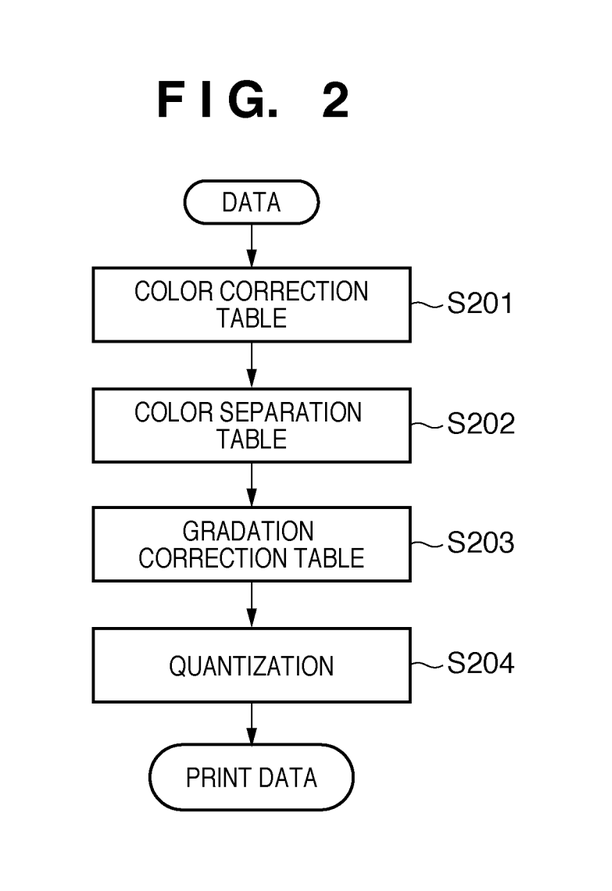
FIG. 2 is a flow chart showing a procedure of print image processing performed by an ordinary RGB printer.

FIG. 2 is a flow chart showing a procedure of print image processing performed by an ordinary RGB printer. First, in step S201, data such as image data or document data that is to be printed is converted using a color correction table. Specifically, color gamut compression from the color space of input data to the color space of a printer or color processing of memory color, for example, is performed. Here, a general approach is conversion from the input color space to the RGB color space of a printer device using a three-dimensional LUT. Next, in step S202, data is broken down into signal values for ink components, such as CMYK, using a color separation table. Here, a general approach is conversion from the three-dimensional RGB color space of a printer device to n-dimensional colors of printer ink using a multi-dimensional LUT. Then, in step S203, gradation correction is performed on the signal values for ink components such as CMYK, using a one-dimensional LUT called a gradation correction table. As a last step, in step S204, data is converted into ink dot signals by quantization conversion using error diffusion or dithering, and transferred to and printed on a printer as print data.

Figure 3:
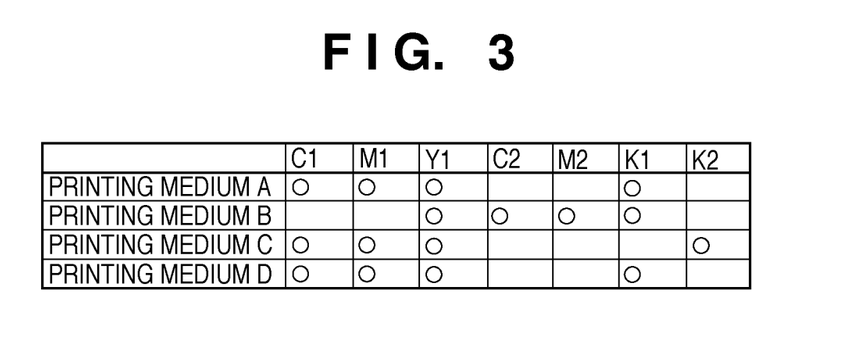
FIG. 3 illustrates the relationship between printing media and available inks.

FIG. 3 illustrates the relationship between printing media, such as printing media, and available inks according to the present embodiment. In the present embodiment, cyan ink (C1/C2), magenta ink (M1/M2), and black ink (K1/K2) each have two types with different characteristics, and yellow ink (Y1) has only a single type. Available inks are determined for each printing medium; an optimum combination is determined in consideration of ink characteristics and printing medium characteristics. White circles in the figure represent inks used for each printing medium. Printing medium A is printed with C1, M1, Y1, and K1; printing medium B is printed with C2, M2, Y1, and K1; printing medium C is printed with C1, M1, Y1, and K2; and printing medium D is printed with C1, M1, Y1, and K1.

Next, the calibration technique is described. The principles of calibration are first described. Continuous use of a printer results in variations in the output characteristics of the printer, such as output colors and gradation, due to changes in the density of ink, the ink discharge characteristics of heads, or the like with the passage of time. Variations in the density of ink with the passage of time even occur in the same ink tank, due to a phenomenon such as the settling of a volatile colorant. In the present embodiment, the ink discharge characteristics of a head refers to the amount of ink discharged from a single nozzle (the amount of ink discharged). While the amount of ink is generally measured in weight or volume, the present embodiment uses weight (ng) in the description.

The amount of ink discharged is primarily determined by the characteristics of a head, such as the diameter of a head nozzle or the voltage, and it also varies with changes with the passage of time, other than variations caused during manufacturing. The amount of ink discharged also varies depending on the structure of each ink head and the viscosity of each ink. Here, a certain amount of discharge is defined as a reference amount of discharge. In the present embodiment, the reference amount of discharge is defined as an amount of discharge that is the center of a difference during manufacturing; specifically, the reference amount of discharge is defined as 3 ng. A rank value for the amount of discharge during calibration (hereinafter simply referred to as a rank value) is defined based on the reference amount of discharge. Assuming that the rank value for the reference amount of discharge is zero, a minus value represents a shift in the minus direction from the reference amount of discharge, and a plus value represents a shift in the plus direction from the reference amount of discharge. In the present embodiment, the rank value is increased or decreased by one for every shift of 0.1 ng. For example, if the amount of discharge is 2.6 ng, the rank value is −4.

A large amount of ink discharged produces a print result in dark colors, whereas a small amount of ink discharged produces a print result in light colors. If the amounts of ink discharged are certain, correction can be performed so that even those heads that have different amounts of ink discharged can produce the same output characteristics such as output colors and gradation. For example, if the rank value is +3, the amount of discharge is 3.3 ng, so that an amount of ink 10% more than the reference amount of ink discharged is deposited on a printing medium. Thus, in step S203 of conversion using a gradation correction table, a gradation correction table is created so that the amount of discharge is reduced by 10%, as compared to the gradation correction table of the reference amount of discharge, and correction is performed using the created table. As a result, the same output characteristics as will be obtained from the reference amount of discharge can be produced with a printer where the amount of ink discharged has a rank value of +3.

Alternatively, a printer having a rank value of +3 may actually be prepared and a gradation correction table may actually be created so that its output characteristics coincide with those obtained from the reference amount of discharge. That is, such a gradation correction table that produces the same output characteristics as will be obtained from the reference amount of discharge is prepared in advance for every rank value. If a rank value for each ink is certain, correction may be performed using a gradation correction table that has been prepared in advance for each rank value, in which case the same output characteristics can be produced by the correction irrespective of the amount of discharge of each ink.

Figure 15:
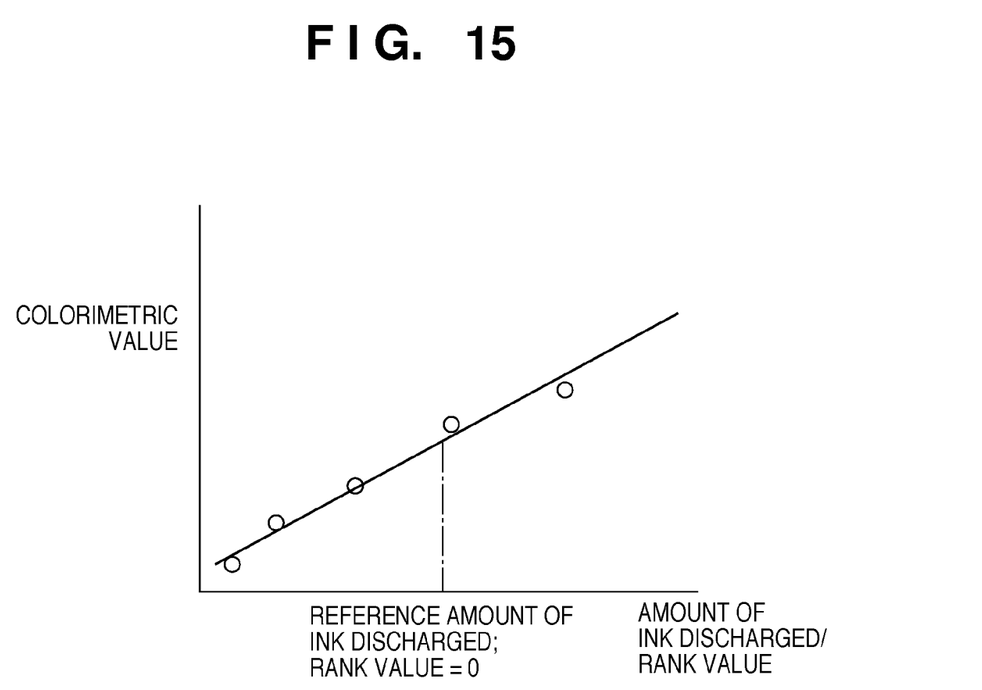
FIG. 15 is a diagram illustrating the correspondence between the colorimetric value and the amount of ink discharged.

FIG. 15 is a diagram illustrating an example that plots the relationship between the amounts of certain ink discharged and output colorimetric values in the case of using printers with different amounts of ink discharged for output. It can be seen from the figure that there is a correlation between the amounts of ink discharged and the output colors. In other words, checking the output color (colorimetric value) for each ink color enables the estimation of the amount of ink discharged or the rank value for the ink that is associated with each output color. In actuality, the estimation of the amount of ink discharged is possible based on not only the difference in the amount of ink discharged due to different nozzle diameters or the like, but also variations in the output color due to changes in the density of ink or the like. By changing a gradation correction table according to the estimated amount of discharge or the estimated rank value, variations due to changes in the density of ink can also be properly corrected at the same time. As described above, the estimated amount of ink discharged or the estimated rank value depends only on the printer head and the density of ink without depending on the type of printing medium. In the present embodiment, such information about the amount of ink discharged or the rank value is referred to as calibration information (density correction information).

Next, a calibration procedure is described. An actual calibration process performed by a user is broadly divided into two steps. Those are the step of acquiring calibration information and the step of correcting and printing output using the acquired calibration information. The calibration-information-acquiring step is performed at regular intervals in order to grasp variations in the output characteristics with the passage of time. In addition, it is also performed in isolation if the output characteristics may vary largely due to the replacement of a head or ink, for example.

Figure 4:
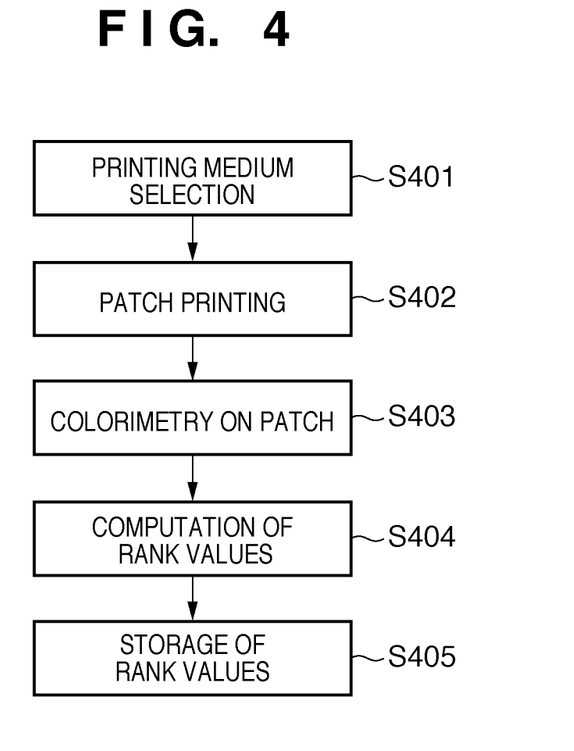
FIG. 4 is a flow chart showing a procedure for computing calibration information.

The process for acquiring calibration information is described in detail with reference to FIG. 4. First, in step S401, a printing medium used to acquire calibration information is specified by a user. In step S402, a patch is printed using patch data for use in acquiring calibration information. In step S403, the printed patch is subjected to colorimetry. In step S404, calibration information is acquired from the obtained colorimetric value. In step S405, the acquired calibration information is stored.

In step S401, a user specifies a printing medium on which a patch that is necessary to acquire calibration information is printed. This printing medium may be a printing medium that will actually be used later to print data or may be any other handy printing medium. In step S402, a patch is printed in a single color ink in order to acquire the amount of discharge of each ink. Since the available inks vary for each printing medium, a patch is printed for only each of those inks that can be used for the printing medium specified in step S401. In step S403, the colorimetric value of the printed patch is acquired. Although colorimetry is performed with a colorimeter, the colorimetric value may be acquired in an abbreviated way, such as using a scanner, a camera, and so on; or as another alternative, an RGB value may be used as it is.

In step S404, calibration information is acquired from the colorimetric value. As illustrated in FIG. 15, there is correlation between the amounts of ink discharged and the colorimetric values. From this, a colorimetric value may be obtained in advance for each amount of ink discharged and stored in the form of a list or the like, then a measured colorimetric value may be compared with the stored colorimetric value, and then the amount of ink discharged that corresponds to the closest colorimetric value may be estimated as the amount of ink discharged for a current printer. The acquired amount of ink discharged is defined as calibration information on a printer at time A when a patch has been printed (the acquisition of the amount of discharge).

The relationship between the amounts of ink discharged and the colorimetric values, which has been stored in advance, may be held on a look-up table (LUT) so that the closest colorimetric value is acquired by referring to the LUT. As an alternative method, the relationship between the amounts of ink discharged and the colorimetric values may be approximated using a linear expression, and the resultant linear expression may be stored and used for computation. To increase the accuracy of such a relationship, a higher-order expression may be used for approximations, instead of a linear expression. It is also necessary to obtain and hold a colorimetric value of each amount of ink discharged in advance for each printing medium, because even though the same amount of ink is discharged, color-development characteristics vary depending on the type of printing medium. At this time, the relationship between the amounts of ink discharged and the colorimetric values is defined so that the same value for the calibration information is acquired for those printers under the same conditions, even with the use of different printing media.

In step S405, the acquired calibration information is stored. Here, information to be acquired includes, in addition to the calibration information, the time when the calibration information was acquired, the printing medium used to acquire the calibration information, and so on. Those pieces of information are accumulated and stored in, for example, a memory every time the calibration information is acquired. Here, as a step of acquiring calibration information, multiple patches having different densities may be printed to acquire the amount of ink discharged, in order to increase the accuracy of such estimation.

Figure 5:
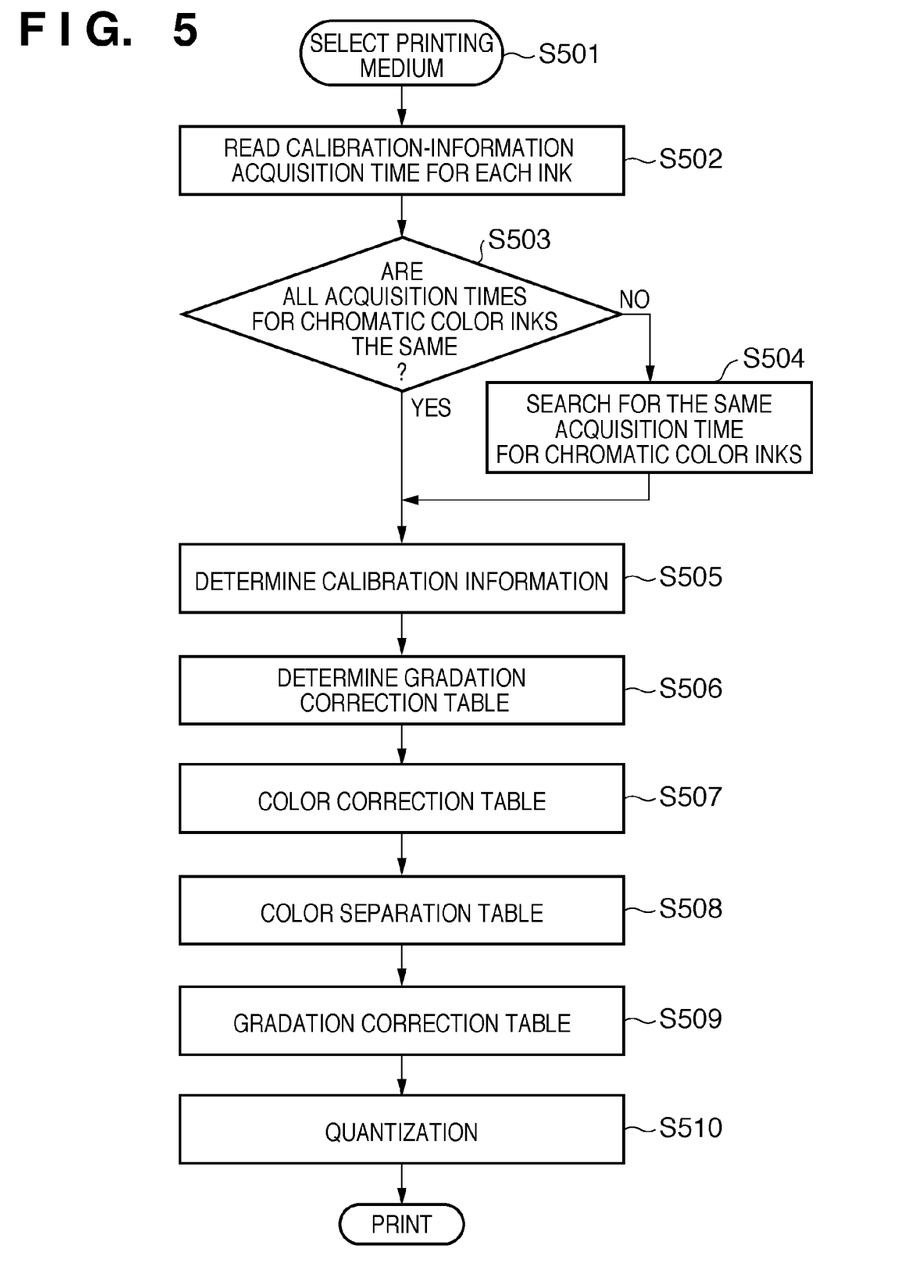
FIG. 5 is a flow chart showing a procedure for correcting output according to computed calibration information.

Next, a process for correcting print densities for printing using the acquired calibration information according to the present embodiment is described in detail with reference to FIG. 5. In addition to the ordinary printing procedure described with reference to FIG. 2, a gradation correction table is changed using the acquired calibration information. First, a printing medium used for printing and the print quality, both specified by a user, are accepted in step S501. In step S502, the most up-to-date time when the calibration information was acquired for each of the inks associated with the specified printing medium is read from stored multiple pieces of calibration information. Then, in step S503, it is determined whether or not pieces of calibration information on chromatic color inks, from among the inks that can be used for the specified printing medium, have been acquired at the same time. Although described in detail later, the chromatic color inks include, for example, cyan (C) ink, magenta (M) ink, and yellow (Y) ink. If the most up-to-date times when those pieces of calibration information on these chromatic color inks have been acquired are the same time, it is determined that the information at this time can be used, and the process proceeds to step S505. If the most up-to-date times are not the same time, then in step S504, a time when the pieces of calibration information on the chromatic color inks were acquired at the same time is searched for from among the times stored in the above mentioned memory or the like when past calibration information was acquired, and the process proceeds to step S505. In step S505, the calibration information (e.g., rank values) on the chromatic color inks obtained at the same time is determined, and based on this calibration information, an optimum gradation correction table is selected in step S506.

In step S507, data is color-converted using a color correction table. Furthermore, in step S508, the data is converted into signal values for ink components using a color separation table. In step S509, the data is converted using the gradation correction table selected in step S506. As a last step, in step S510, the data is converted into ink dot signals by quantization conversion using error diffusion or dithering and transferred to and printed on a printer as print data. In this way, changing the gradation correction table according to the acquired calibration information enables printing with the optimum output characteristics.

Here, in the present embodiment, the most up-to-date information is used for those inks such as black ink other than the chromatic color inks, irrespective of the difference in the acquisition time from the chromatic color inks. In this case, the acquisition time of such most up-to-date information may be different from the acquisition time for the chromatic color inks. In step S506, an optimum gradation correction table has been prepared in advance for every rank value, and a gradation correction table that corresponds to the rank value determined in step S505 is selected.

In the present embodiment, as mentioned above, available inks vary for each of the printing media A, B, C, and D. Calibration control that varies depending on each printing medium combination and its effect are described next. As illustrated in FIG. 3, the printing medium A is printed with C1, M1, Y1, and K1; the printing medium B is printed with C2, M2, Y1, and K1; the printing medium C is printed with C1, M1, Y1, and K2; and the printing medium D is printed with C1, M1, Y1, and K1. Depending on each printing medium, an optimum combination of inks is used properly in consideration of ink characteristics and printing medium characteristics.

Since the available inks are different depending on each printing medium and the print quality so that all inks cannot be used for a single printing medium, calibration information on all inks cannot be acquired at the same time. Acquiring calibration information on every necessary ink each time is troublesome for a user. Considering such user efforts, it is necessary to combine those pieces of calibration information that have been obtained at different times and to thereby enable calibration that has a small influence on the visual characteristics.

In terms of the visual characteristics, the following can be said. That is, in terms of human visual characteristics, humans are more sensitive to gray- and skin-color reproduction than highly saturated color reproduction. From this, the gray- and skin-color reproduction, i.e., the color balance is important for the accuracy required during calibration. Moreover, if shifts in the color balance are reduced to a minimum in order to reduce color areas where shifts are large, it is possible to enable calibration that has a small influence on visual characteristics.

In the case of using those pieces of calibration information that have been obtained at different times, the calibration information on only specific color inks may be shifted in some cases. We now describe the influence in such a case where the calibration information on only specific color inks has been shifted. If some chromatic color inks such as cyan (C), magenta (M), yellow (Y), light cyan (Lc), and light magenta (Lm), are shifted, the color balance is disturbed. This is even more noticeable in gray and skin colors, to which humans are more sensitive in terms of visual characteristics; therefore, such shifts are undesirable. It can be said that shifts in chromatic color inks have a great influence on visual characteristics.

On the other hand, in the case where achromatic color inks such as black (K) ink and gray (Gr) ink are shifted, such shifts affect only the brightness components and thus give no influence on the color balance. That is, shifts in the brightness components are more allowable than shifts in the color balance, from which it can be said that shifts in the achromatic color inks have a small influence on visual characteristics.

Moreover, for spot color inks such as red (R), green (G), and blue (B), consider the case where such spot colors are not used on the gray axis or the case where such spot colors are used in only certain color areas. In this case, shifts occur only in certain color areas without having any influence on both skin and gray colors; therefore, it can be said that shifts in spot color inks have a small influence on visual characteristics.

Figure 6:
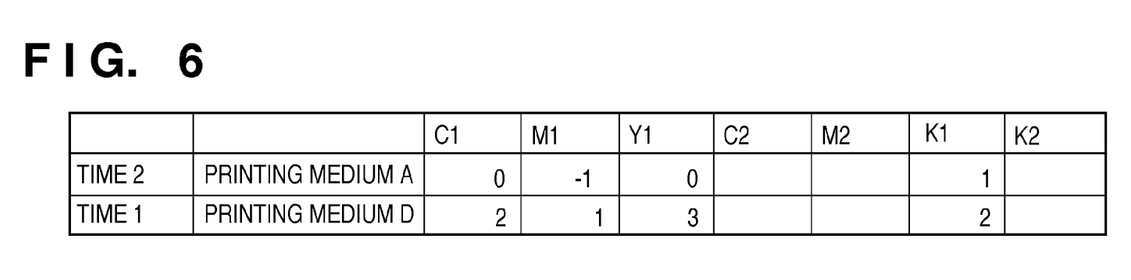
FIG. 6 is a diagram showing rank values for inks used for printing media A and D.

Now, each printing medium combination is described using realistic examples. First, a combination of printing media A and D is described with reference to FIG. 6 and FIG. 7. As illustrated in FIG. 6, the same inks, namely C1, M1, Y1, and K1 are commonly used for those two printing media A and D. First, rank values at time 1 are acquired using the printing medium D. After the elapse of a certain period of time, rank values at time 2 are acquired using the printing medium A. Numerical values in the figure represent the rank values.

Figure 7:
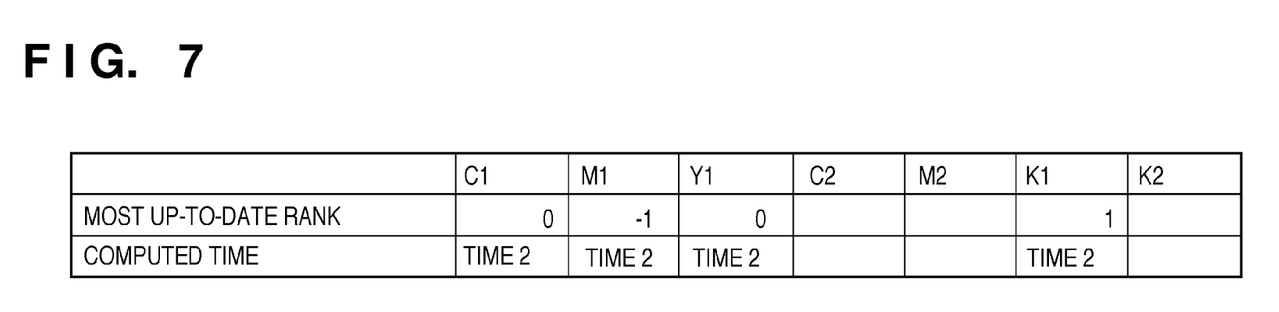
FIG. 7 is a diagram explaining an example of a combination of the rank values of the inks used for the printing media A and D.

At time 1 and time 2, the rank values for the same inks are acquired; the difference between the rank values at time 1 and the rank values at time 2 are due to changes in the amounts of ink discharged, including the densities of the inks, with the passage of time. The calibration information that is close to the most up-to-date amount of ink discharged is the one acquired at later time 2.

Consider the case where the printing medium A is printed at time 3, which is almost the same as time 2. It is apparent that the optimum result is obtained with the calibration information acquired at time 2. Meanwhile, consider the case where the printing medium D is printed at time 4, which is almost the same as time 2. In that case, since the calibration information on all inks that are used for the printing medium D, namely C1, M1, Y1, and K1, has been acquired at time 2, the optimum result can be obtained with the result acquired at time 2.

Figure 8:
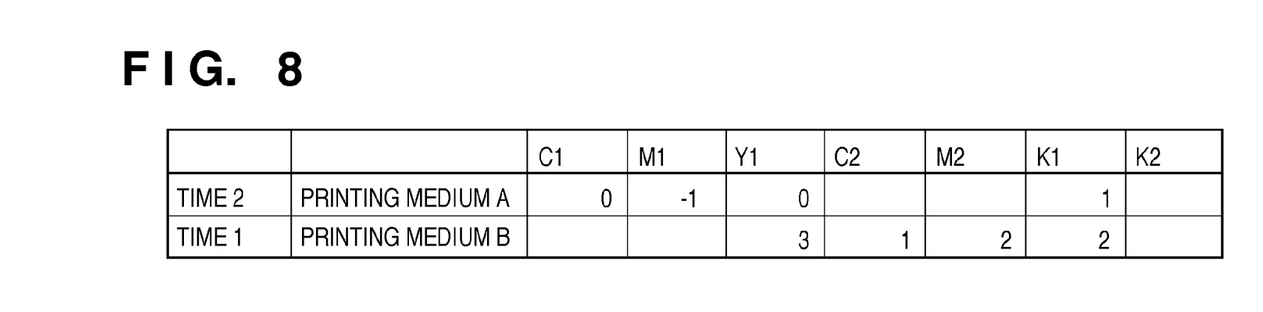
FIG. 8 is a diagram showing rank values for inks used for printing media A and B.

Next, a combination of printing media A and B is described with reference to FIGS. 8 and 9. Although some of the inks, namely Y1 and K1, are commonly used for printing media A and B, the other inks, namely C1, M1, C2, and M2, are not. First, rank values are acquired at time 1 using the printing medium B. After the elapse of a certain period of time, rank values are acquired at time 2 using the printing medium A. Now, consider the case where the printing medium A is printed at time 3, which is almost the same as time 2. In this case, it is apparent that the optimum result can be obtained with the calibration information acquired at time 2. Meanwhile, consider the case where the printing medium B is printed at time 4, which is almost the same as time 2. Of the inks C2, M2, Y1, and K1 used for the printing medium B, Y1 and K1 have the most up-to-date calibration information acquired at time 2, while C2 and M2 have the most up-to-date calibration information acquired at time 1. If the most up-to-date information is used, the acquisition time of information for only Y1, out of the chromatic color inks C2, M2, and Y1, is different.

Here, changes in the amount of ink discharged with the passage of time are described. In general, if multiple colors of ink are used under the same conditions, their amounts discharged vary similarly with the passage of time, so that the color balance is maintained. However, if each ink is used under different conditions, the ink that is used more undergoes a greater change with time, thus disturbing the color balance with the passage of time.

Figure 9:
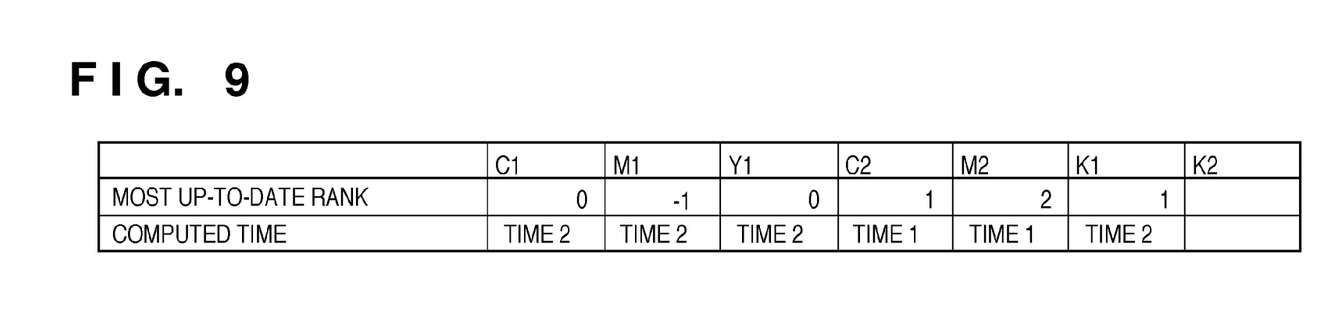
FIG. 9 is a diagram explaining an example of a combination of the rank values of the inks used for the printing media A and B.

At time 4 mentioned above, if the most up-to-date rank value is to be used for each ink, the rank value acquired at time 1 is used for C2 and M2, and the rank value acquired at time 2 is used for Y1 as shown in FIG. 9. It can be seen from FIG. 8 that the most up-to-date information or rank value for Y1 at time 2 is smaller than that at time 1. Thus, at time 4, if the calibration information at time 2 is used for Y1 ink, Y1 ink is discharged more than in the case where the calibration information at time 1 is used. This disturbs the color balance with C2 ink and M2 ink for which the calibration information at time 1 is used. Thus, in the case where the printing medium B is printed at time 4, the calibration information at time 1, when the rank values for all the chromatic color inks C2, M2, and Y1 have been acquired at the same time, is used in order to enable printing while maintaining the color balance.

Meanwhile, K1 affects the brightness components and it becomes closer to the brightness that is intrinsically required to be output by using the most up-to-date calibration information; therefore, the most up-to-date information at time 2 is used.

As described, in the case of using different chromatic color inks for each printing medium, the calibration-information acquisition times for all chromatic color inks may not be the same in some cases. In such a case, if the most up-to-date calibration information is used for each ink, the color balance is disturbed. As a countermeasure against this, in the present embodiment, the calibration information that was obtained at the same time is used for every chromatic color ink, which enables printing while maintaining the color balance.

Figure 10:
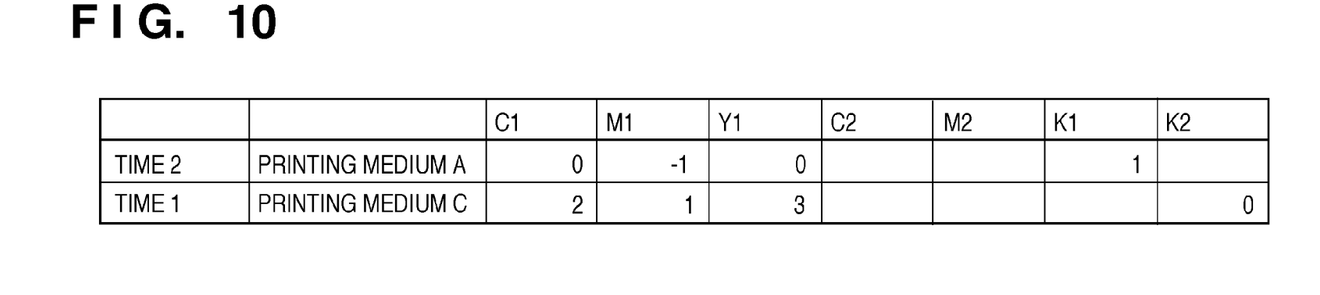
FIG. 10 is a diagram showing rank values for inks used for printing media A and C.
Figure 11:
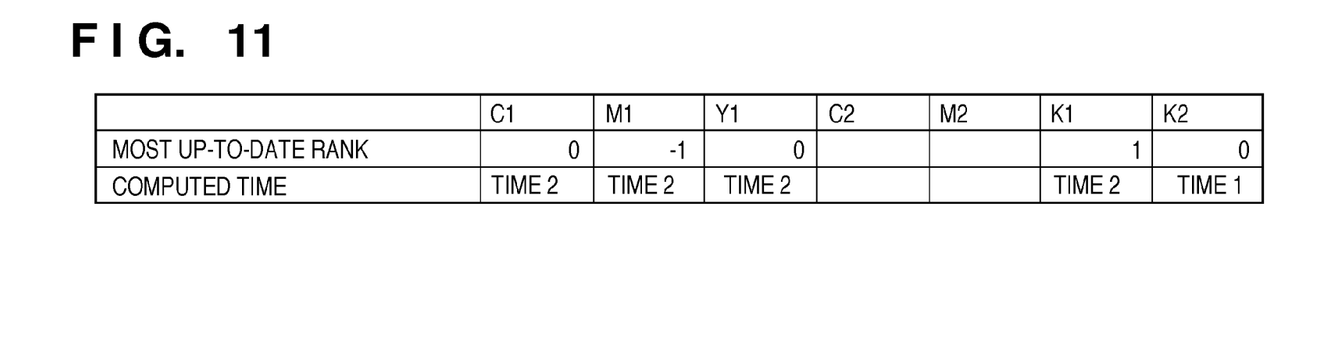
FIG. 11 is a diagram explaining an example of a combination of the rank values of the inks used for the printing media A and C.

Next, a combination of printing media A and C is described with reference to FIGS. 10 and 11. Although some of the inks, namely C1, M1, and Y1, are commonly used for the printing media A and C, the other inks, namely K1 and K2, are not. First, rank values at time 1 are acquired using the printing medium C. After the elapse of a certain period of time, rank values at time 2 are acquired using the printing medium A. Then, consider the case where the printing medium A is printed at time 3, which is almost the same as time 2. In this case, it is apparent that the optimum result can be obtained with the calibration information at time 2. Meanwhile, consider the case where the printing medium C is printed at time 4, which is almost the same as time 2. Of the available inks C1, M1, Y1, and K2 for the printing medium C, C1, M1, and Y1 have the most up-to-date calibration information acquired at time 2, and K2 has the calibration information acquired at time 1. The most up-to-date calibration information on the chromatic color inks C1, M1, and Y1 has been acquired at the same time, so that printing produces the proper output characteristics while maintaining the color balance. On the other hand, the calibration information on K2 had been acquired some time ago, and the different in its acquisition time from the most up-to-date acquisition time has influence on the brightness components, causing shifts in the brightness components. However, because the brightness components have a smaller influence on the visual characteristics than the color balance, the information at time 1 can be used as is. In this case, only the brightness components are shifted from their original output characteristics, so this is regarded as allowable in terms of the calibration effect.

As described above, calibration information to be used for each ink is selected from among multiple pieces of calibration information acquired at different times, which makes the calibration effect allowable while saving a user from having to acquire information each time. In addition, calibration with a minimum shift in the color balance can be achieved by creating such conditions that pieces of calibration information on chromatic color inks should be acquired at the same time and those pieces of calibration information on the other color inks may be acquired at different times.

Second Embodiment

Figures 12, 13:
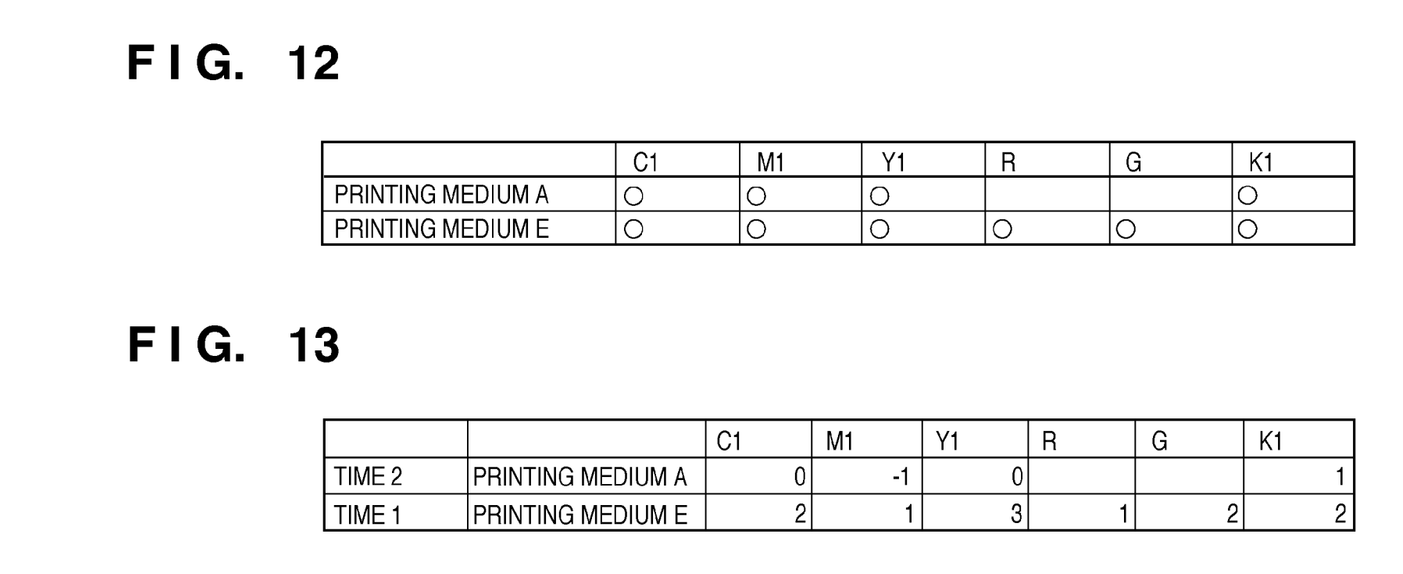
FIG. 12 is a diagram showing inks used for printing media A and E.
FIG. 13 is a diagram showing rank values for inks used for printing media A and E.

A second embodiment describes the case where the relationship between printing media and available inks are different from those described in the first embodiment. FIG. 12 illustrates the relationship between printing media and available inks according to the present embodiment. White circles in the figure represent the available inks for each printing medium. In the present embodiment, cyan ink (C1), magenta ink (M1), yellow ink (Y1), and black ink (K1) are used for both printing media, whereas red ink (R) and green ink (G) are used for only the printing medium E. The printing medium A is printed with C1, M1, Y1, and K1, and the printing medium E is printed with C1, M1, Y1, K1, R, and G. R ink and G ink have the feature that they are used neither on the gray axis nor in skin color areas and are used in only highly saturated red and green color areas.

Figure 14:
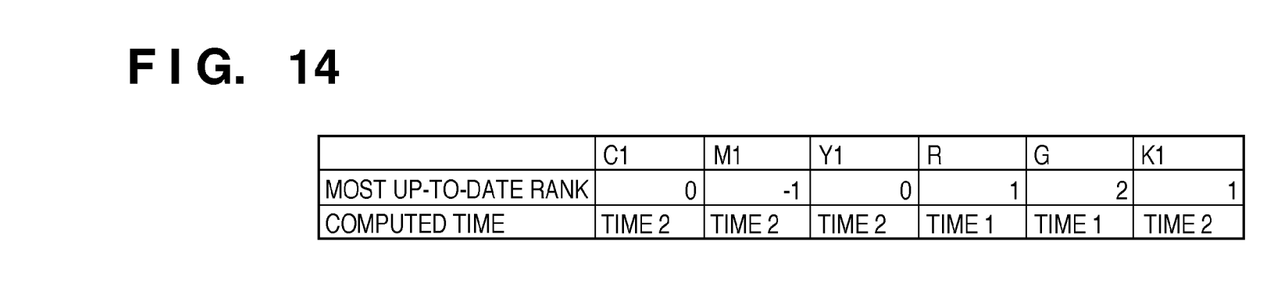
FIG. 14 is a diagram explaining an example of a combination of the rank values of the inks used for the printing media A and E.

Next, a combination of printing media A and E is described with reference to FIGS. 13 and 14. Although some of the inks, namely C1, M1, Y1, and K1, are commonly used for the printing media A and E, R ink and G ink are used for only the printing medium E. First, rank values at time 1 are acquired using the printing medium E. After the elapse of a certain period of time, rank values at time 2 are acquired using the printing medium A. Then, consider the case where the printing medium A is printed at time 3, which is almost the same as time 2. In this case, it is apparent that the optimum result can be obtained with the calibration information at time 2. Meanwhile, consider the case where the printing medium E is printed at time 4, which is almost the same as time 2. Of the available inks C1, M1, Y1, K1, R, and G for the printing medium E, C1, M1, Y1, and K1 have the most up-to-date calibration information acquired at time 2, and R and G have the most up-to-date calibration information acquired at time 1. Since the most up-to-date information on every chromatic color ink, C1, M1, and Y1, has been acquired at the same time, it is possible to produce the proper output characteristics while maintaining the color balance. Since the information on K1 ink is also up-to-date, the proper output characteristics can be produced. On the other hand, the information on R ink and G ink has been acquired some time ago, so that a difference in its acquisition time from the most up-to-date acquisition time causes some shifts; however, because those inks are used neither on the gray axis nor in skin color areas and are used in only highly saturated red and green color areas, they have influence on only certain color areas. That is, since they are used in only certain color areas, they have a smaller influence on the visual characteristics than the color balance. Accordingly, the information acquired at time 1 can be used as is. In this case, since only certain color areas may have a shift from the original output characteristics, the calibration effect can be regarded as allowable.

As described above, calibration information to be used for each ink is selected from multiple pieces of calibration information that have been acquired at different times, which makes the calibration effect allowable while saving a user from having to acquire information each time. In addition, calibration with a minimum shift in the color balance can be achieved by creating such a condition that calibration information on every chromatic color ink, except spot color ink, should be acquired at the same time. Moreover, as in the present embodiment, if the calibration information on every chromatic color ink, except spot color ink, can be acquired with certainty at the same time irrespective of the type of printing medium, the most up-to-date calibration information may always be acquired in step S505.

Third Embodiment

The first and second embodiments have been described on the premise that calibration information on every chromatic color ink that satisfies the condition that available inks for each printing medium are always included in a history. However, calibration information that satisfies such a condition may not always be included in a history. Or the following case is also conceivable, i.e., even if included in a history, calibration information may have been acquired at a time that is older than a predetermined time and thus may not be usable in the production of a sufficient correction effect. An example of such a case is described.

The calibration-information-acquiring step is as described in the first embodiment. Described below is a step of correcting and printing output using acquired calibration information. First, in step S501, a printing medium to be used for printing and the print quality thereof are specified by a user. Then, in step S502, the most up-to-date time when the calibration information has been acquired is read from stored multiple pieces of calibration information for each of the inks associated with the specified printing medium. Then, in step S503, it is determined whether or not those pieces of calibration information on chromatic color inks, out of the available inks for the specified printing medium, have been acquired at the same time. If they have been acquired at the same time, the same processing as described in the first embodiment is performed. If they have not been acquired at the same time, although in the first embodiment, the calibration information is determined by searching for the time when those pieces of information have been acquired at the same time from among past acquisition times; in the present embodiment, a message notifying a user that a proper calibration result cannot be obtained is given to the user. Alternatively, a message notifying a user that another try is necessary to acquire calibration information is given to the user. If the user who has received such a message cancels printing, the printing process is ended. If the user who has received such a message tries to continue printing, the calibration information held as initial values is used to continue printing. As another alternative, if those pieces of information on chromatic color ink, out of the available inks, have been acquired at the same time, a difference between that acquisition time and the current time is obtained and, if the information is old information that has been held for more than a predetermined period of time, a similar message may be displayed. If printing is continued even after the display of such a message, the current calibration information is used as is to continue printing.

In this way, even in such a case where a sufficient calibration effect cannot be obtained, the present embodiment allows a user to determine whether to continue printing or not by displaying a message to a user. Here, if necessary, calibration information may be acquired again in order to produce a sufficient calibration effect.

As described above, since available inks vary depending on each printing medium and the quality, the use of calibration information acquired at a different time for each ink enables calibration that reduces user effort. The use of calibration information acquired at the same time for all chromatic color inks further enables calibration that minimizes a shift in the color balance, to which humans are more sensitive in terms of visual characteristics, and that reduces variations in the output characteristics of a printer due to changes with time or the like.

In addition, calibration can be implemented while minimizing a shift in the color balance (in particular, in the vicinity of gray- and skin-color areas), to which humans are more sensitive in terms of visual characteristics than to a shift in brightness and a shift in only a certain color area, these shifts being much more allowable in terms of human visual characteristics, as well as reducing variations in the output characteristics due to changes with time or the like.

Also, in the case where there is no calibration information that makes a shift in the color balance allowable or in the case where information is older than a predetermined time, either a warning or notification that causes a user to perform calibration again is given to a user, which prevents printing with a shift in the color balance.

Other Embodiments

While the ink system described in the above-described embodiments uses chromatic color inks such as cyan, magenta, and yellow, the configuration of the ink system is not limited thereto; the ink system may use light cyan ink, light magenta ink, or light yellow ink.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a printing medium of various types serving as the memory device (e.g., computer-readable medium).

Note that the present invention may be applied to a system constituted from a plurality of devices (such as a personal computer, an interface device, a scanner, a printer, and a colorimeter). As another alternative, the present invention may be applied to an apparatus (e.g., a color copying machine, a color facsimile machine, or multifunctional peripherals) composed of a combination of those devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-031966 filed Feb. 13, 2009 and 2010-014677 filed Jan. 26, 2010, which are hereby incorporated by reference herein in their entirety.

What is claimed is:

1. An image correction system that measures a patch printed on a printing medium with an inkjet printer, so as to perform density correction on image data to be printed, the inkjet printer being capable of printing with inks that include a plurality of chromatic colors, the system comprising:

a colorimetric-value-acquiring unit configured to acquire colorimetric values by performing colorimetry on patches printed with the inkjet printer in those of the inks that have been associated for use with each of a plurality of kinds of printing media;

a storage unit configured to obtain density correction information for each ink color based on the colorimetric values acquired by the colorimetric-value-acquiring unit and store the density correction information and a time when the density correction information has been acquired in a memory in association with the ink color;

a receiving unit configured to receive information about user selection of a printing medium used for printing;

a reading unit configured to read, from among the times stored in the memory, the most up-to-date times for the inks that are used for printing on the printing medium that corresponds to the information received by the receiving unit;

a determining unit configured to determine whether or not the most up-to-date times for multiple chromatic color inks, out of the most up-to-date times read by the reading unit for the inks used for printing on the printing medium, are the same time; and a correction unit configured to, if the determining unit has determined that the most up-to-date times are the same time, perform density correction on the image data to be printed according to the density correction information acquired at the most up-to-date time;

wherein if the determining unit has determined that the most up-to-date times are not the same time, the reading unit reads, from among the times stored in the memory, a time when the density correction information on all the multiple chromatic color inks has been acquired at the same time, and the correction unit performs density correction on the image data to be printed according to the density correction information acquired at the time when the density correction information on all the multiple chromatic color inks has been acquired at the same time.

2. The image correction system according to claim 1, wherein the information includes information about print quality and a type of a printing medium that is used for printing and that has been selected from among the plurality of kinds of printing media.

3. The image correction system according to claim 1, wherein the density correction information is a rank value relating to an amount of ink discharged, and the storage unit is configured to, every time acquiring an amount of ink discharged that corresponds to the colorimetric value acquired by the colorimetric-value-acquiring unit by referring a list of predetermined associations between colorimetric values and amounts of ink discharged for each of a plurality of printing media, store the amount of ink discharged, together with a time when the colorimetric value has been acquired, in a memory in association with each of the inks that are used to print patches on the printing medium.

4. The image correction system according to claim 1, wherein the chromatic color inks are of chromatic colors other than a spot color ink that is not used to output gray and colors in its vicinity or a spot color ink that is used in only a certain specific color area.

5. The image correction system according to claim 1, wherein, for an achromatic color ink, the correction unit performs density correction on the image data to be printed according to the density correction information that has been acquired at the most up-to-date time.

6. An image correction method for measuring a patch printed on a printing medium with an inkjet printer, so as to perform density correction on image data to be printed, the inkjet printer being capable of printing with inks that include a plurality of chromatic colors, the method comprising:

a colorimetric-value-acquiring step of acquiring colorimetric values by performing colorimetry on patches printed with the inkjet printer in those of the inks that have been associated for use with each of a plurality of kinds of printing media;

a storage step of obtaining density correction information for each ink color based on the colorimetric values acquired in the colorimetric-value-acquiring step and storing the density correction information and a time when the density correction information has been acquired in a memory in association with the ink color;

a receiving step of receiving information about user selection of a printing medium used for printing;

a reading step of reading, from among the times stored in the memory, the most up-to-date times for the inks that are used for printing on the printing medium that corresponds to the information received by the receiving unit;

a determining step of determining whether or not the most up-to-date times for multiple chromatic color inks, out of the most up-to-date times read by the reading unit for the inks that are used for printing on the printing medium, are the same time;

a correction step of, if it has been determined in the determining step that the most up-to-date times are the same time, performing density correction on the image data to be printed according to the density correction information acquired at the most up-to-date time;

a second reading step of, if it has been determined in the determining step that the most up-to-date times are not the same time, reading, from among the times stored in the memory, a time when the density correction information on all the multiple chromatic color inks has been acquired at the same time; and a second correction step of performing density correction on the image data to be printed according to the density correction information acquired at the time when the density correction information on all the multiple chromatic color inks has been acquired at the same time.

7. The image correction method according to claim 6, wherein the information includes information about print quality and a type of a printing medium that is used for printing and that has been selected from among the plurality of kinds of printing media.

8. The image correction method according to claim 6, wherein the density correction information is a rank value relating to an amount of ink discharged, in the storage step, every time an amount of ink discharged that corresponds to the colorimetric value acquired in the colorimetric-value-acquiring step is acquired by referring to a list of predetermined associations between colorimetric values and amounts of ink discharged for each of a plurality of printing media, the amount of ink discharged is stored, together with a time when the colorimetric value has been acquired, in a memory in association with each of the inks that are used to print patches on the printing medium.

9. The image correction method according to claim 6, wherein the chromatic color inks are of chromatic colors other than a spot color ink that is not used to output gray and colors in its vicinity and a spot color ink that is used in only a certain specific color area.

10. The image correction method according to claim 6, wherein, in the correction step, for an achromatic color ink, density correction is performed on the image data to be printed according to the density correction information that has been acquired at the most up-to-date time.

11. An image processing apparatus for printing by using a first color ink and a second color ink based on first data for the first color ink and second data for the second color ink, the apparatus comprising:

a storing unit configured to store pieces of first density correction information corresponding to the first color ink for correcting the first data and pieces of second density correction information corresponding to the second color ink for correcting the second data, wherein each of the pieces of first density correction information corresponds to time information indicating a timing in which each of the pieces of first density correction information is acquired, and wherein each of the pieces of second density correction information corresponds to time information indicating a timing in which each of the pieces of second density correction information is acquired; and a determining unit configured to determine a combination of one of the pieces of first density correction information and one of the pieces of second density correction information for correcting the first data and the second data such that a timing indicated by the time information corresponding to the first density correction information of the combination is the same as a timing indicated by the time information corresponding to the second density correction information of the combination.

12. The apparatus according to claim 11, wherein the first color ink and the second color ink are chromatic color inks.

13. The apparatus according to claim 11, wherein the first density correction information for correcting the first data and the second density correction information for correcting the second data are gradation correction tables for correcting an input signal value.

14. The apparatus according to claim 11, further comprising: a printing unit configured to print by using the first color ink and the second color ink in a case where an image is printed on a first print medium, and to print by using not the first color ink but the second color ink in a case where an image is printed on a second print medium which is a different type from the first print medium.

15. The apparatus according to claim 11, wherein in a case where the storing unit stores a plurality of combinations in which respective combinations of a timing indicated by the first density correction information and a timing indicated by the second density correction information are the same as each other, the determining unit determines the combination having a latest timing.

16. An image processing method for printing by using a first color ink and a second color ink based on first data for the first color ink and second data for the second color ink, the method comprising:

obtaining pieces of first density correction information corresponding to the first color ink for correcting the first data and pieces of second density correction information corresponding to the second color ink for correcting the second data, wherein each of the pieces of first density correction information corresponds to time information indicating a timing in which each of the pieces of first density correction information is acquired, and wherein each of the pieces of second density correction information corresponds to time information indicating a timing in which each of the pieces of second density correction information is acquired;

determining a combination of one of the pieces of the first density correction information and one of the pieces of the second density correction information for correcting the first data and the second data such that a timing indicated by the time information corresponding to the first density correction information of the combination is the same as a timing indicated by the time information corresponding to the second density correction information of the combination.

17. The method according to claim 16, wherein the first color ink and the second color ink are chromatic color inks.

18. The method according to claim 16, wherein the first density correction information for correcting the first data and the second density correction information for correcting the second data are gradation correction tables for correcting an input signal value.

19. The method according to claim 16 further comprising: printing by using the first color ink and the second color ink in a case where an image is printed on a first print medium, and printing by using not the first color ink but the second color ink in a case where an image is printed on a second print medium which is different type from the first print medium.

20. The method according to claim 16, wherein in a case where the obtaining step obtains a plurality of combinations in which respective combinations of a timing indicated by the first density correction information and a timing indicated by the second density correction information are the same as each other, the determining step determines the combination having a latest timing.

* * * * *